US011617353B2

(12) United States Patent
Huber et al.

(10) Patent No.: US 11,617,353 B2
(45) Date of Patent: Apr. 4, 2023

(54) ANIMAL SENSING SYSTEM

(71) Applicant: Radmantis LLC, Toledo, OH (US)

(72) Inventors: Robert Huber, Toledo, OH (US); Sebastian Thulani Dylan Huber, Toledo, OH (US)

(73) Assignee: Radmantis LLC, Toledo, OH (US)

( * ) Notice: Subject to any disclaimer, the term of this patent is extended or adjusted under 35 U.S.C. 154(b) by 8 days.

(21) Appl. No.: 17/255,515

(22) PCT Filed: Jun. 27, 2019

(86) PCT No.: PCT/IB2019/000813
§ 371 (c)(1),
(2) Date: Dec. 23, 2020

(87) PCT Pub. No.: WO2020/002997
PCT Pub. Date: Jan. 2, 2020

(65) Prior Publication Data
US 2021/0267172 A1    Sep. 2, 2021

Related U.S. Application Data

(60) Provisional application No. 62/690,607, filed on Jun. 27, 2018.

(51) Int. Cl.
*A01K 29/00* (2006.01)
*A01K 61/90* (2017.01)

(52) U.S. Cl.
CPC ............ *A01K 29/005* (2013.01); *A01K 61/90* (2017.01)

(58) Field of Classification Search
CPC .................................................. A01K 29/005
See application file for complete search history.

(56) References Cited

U.S. PATENT DOCUMENTS 4,009,782 A * 3/1977 Grimshaw .............. G06M 7/00
 209/606
5,324,940 A * 6/1994 Ekstrom ................. A01K 11/00
 250/461.1

(Continued)

FOREIGN PATENT DOCUMENTS

AU   2009100942 A4   10/2009
CA     1336276 C       7/1995

(Continued)

OTHER PUBLICATIONS

PCT International Search Report and Written Opinion, Application No. PCT/IB2019/000813, dated Jan. 3, 2020.

*Primary Examiner* — Travis R Hunnings
(74) *Attorney, Agent, or Firm* — MacMillan, Sobanski & Todd, LLC

(57) ABSTRACT

Animal sensing systems and methods are described. An animal sensing system can include an input section with an entrance and an output section having at least two output paths each having its own exit. An animal can enter the animal sensing system through the entrance. A sensor within a sensing area of the input section can detect one or more characteristics of the animal, and can communicate the detected characteristic(s) to a central processing unit. The central processing unit can use the received data to classify the animal based on the detected characteristic(s), and then control a directional guide, such as a gate, in the animal sensing system on the basis of the classification, so as to direct the animal within the animal sensing system, such as to allow access to only one of the output paths at a time. The animal may thus be allowed to exit the animal sensing system through only one output path, directing the animal to a desired location based on the classification.

30 Claims, 9 Drawing Sheets

(56) References Cited

U.S. PATENT DOCUMENTS

| | | | | |
|---|---|---|---|---|
| 6,899,044 B2* | 5/2005 | Thibault | | A01K 1/0209 |
| | | | | 119/51.02 |
| 8,498,491 B1* | 7/2013 | Steffens | | G06V 40/172 |
| | | | | 382/224 |
| 10,398,133 B2* | 9/2019 | Hilmarsson | | A01K 61/10 |
| 2004/0244712 A1* | 12/2004 | Massey | | A01K 61/90 |
| | | | | 119/216 |
| 2005/0028752 A1* | 2/2005 | Thibault | | A01K 5/02 |
| | | | | 119/524 |
| 2007/0288249 A1* | 12/2007 | Rowe | | A01K 11/008 |
| | | | | 705/7.11 |
| 2008/0017126 A1* | 1/2008 | Adams | | A01K 29/00 |
| | | | | 119/415 |
| 2008/0267471 A1* | 10/2008 | Yu | | G06T 7/0012 |
| | | | | 382/128 |
| 2008/0314325 A1* | 12/2008 | Hempstead | | A01K 1/0023 |
| | | | | 119/51.02 |
| 2011/0023795 A1* | 2/2011 | Huls | | A01K 1/0023 |
| | | | | 119/843 |
| 2014/0088415 A1* | 3/2014 | Hielscher | | A61B 5/0073 |
| | | | | 600/425 |
| 2017/0231215 A1* | 8/2017 | Barton | | A01K 11/006 |
| | | | | 43/60 |
| 2019/0116310 A1* | 4/2019 | Byon | | G06V 40/103 |
| 2019/0124893 A1* | 5/2019 | Bolen | | A01K 61/90 |
| 2021/0060558 A1* | 3/2021 | Brubacher | | G06T 7/0012 |
| 2021/0212292 A1* | 7/2021 | Umegård | | A01K 1/123 |
| 2021/0368747 A1* | 12/2021 | Chrobak | | G06T 7/0012 |
| 2021/0368748 A1* | 12/2021 | James | | G06K 9/6267 |
| 2022/0061260 A1* | 3/2022 | Gross | | A01K 5/02 |

FOREIGN PATENT DOCUMENTS

| | | |
|---|---|---|
| CN | 107740386 A | 2/2018 |
| EP | 2777390 A1 | 9/2014 |
| WO | 2010074585 A1 | 7/2010 |
| WO | 2017081432 A1 | 5/2017 |

\* cited by examiner

ANIMAL SENSING SYSTEM

RELATED APPLICATIONS

This is the national stage entry of international application PCT/IB2019/000813, filed under the authority of the Patent Cooperation Treaty on Jun. 27, 2019, published; which claims priority to U.S. Provisional Application No. 62/690,607 filed under 35 U.S.C. § 111(b) on Jun. 27, 2018. The entire disclosure of each of the aforementioned applications is incorporated herein by reference for all purposes.

BACKGROUND

Invasive alien species are a significant threat to biodiversity, especially in the Great Lakes. Invasive alien species exert damage as predators, competitors, parasites, hybridizers, and disease vectors. They generally share the common features of high rates of reproduction, few natural predators, and an ability to thrive in many environments. Their impact on native ecosystems, habitats, and species can be severe and is often irreversible. The options for controlling invasive alien species are currently limited, generally to manual removal and poison control.

For example, sea lampreys have been in the Great Lakes since the 1850s, and kill about 5 tons of fish per year. The common carp, which has been in the Great Lakes since the 1830s, uproots plants, decreases water quality, and is an omnivorous competitor. Asian carp are similarly prolific omnivorous competitors, alter food webs and ecological communities, and are predators of plankton. Snakeheads have been reproducing in the United States since 2002, and have expanded from being found in a few locales to being a voracious top-level predator that impoverishes the trophic web in freshwater.

North America has about 45 species of invasive alien species of freshwater fish, but the problem is global. For instance, Nile perch, which were introduced to Lake Victoria in 1950, have become a voracious top-level predator in the African Great Lakes, causing the extinction of hundreds of native fish species and impoverishing trophic webs.

The problem of invasive alien species is also not limited to freshwater, or even to water. For example, lionfish on the Atlantic East coast, cane toads in Hawaii and the Caribbean, pythons in the Everglades, rats on islands, and rabbits in Australia have all become problematic. Confronting these threats is costly, as governments spend tens of millions of dollars to combat invasive alien species.

Thus, there is a need in the art for methods and devices for controlling invasive alien species.

SUMMARY

Provided is a method for monitoring and controlling behavior of an animal travelling in the animal's natural environment, the method comprising selecting a designated area of the natural environment where the animal is to be monitored, providing a predetermined data set including characteristics related to a particular animal species and/or type to be identified, monitoring the designated area to determine when the animal enters the designated area, sensing one or more characteristics about the animal when it travels through the designated area, comparing the sensed characteristics of the animal to the predetermined data set in order to determine whether the sensed animal can be classified as the particular species and/or type, and in the event the sensed animal is classified as the particular species and/or type, taking an action to control a path of the animal through the designated area.

Provided is an animal sensing system comprising a sensing area comprising at least one sensor configured to obtain information on one or more characteristics of an animal as the animal passes through the sensing area; and a processing unit communicatively coupled to the sensor; wherein the sensor is configured to communicate the one or more sensed characteristics to the processing unit.

In certain embodiments, the animal is unmarked. In certain embodiments, the animal is untagged. In certain embodiments, the animal is anonymous. In certain embodiments, the sensor may obtain information on one or more characteristics of the animal without physically touching the animal.

In certain embodiments, the animal sensing system comprises an input section comprising an entrance and a sensor configured to obtain information about an animal within the input section; and an output section connected to the input section and comprising a directional guide and multiple output paths, wherein the directional guide is configured to motivate a direction of travel of the animal within the animal sensing system; wherein the processing unit is communicatively coupled to the directional guide, and is configured to receive the information from the sensor and control the directional guide. In particular embodiments, the directional guide comprises a physical gate, or the transient activation of a light, a jet of water current, or electric shocks, magnetic fields, bubble curtains, chemical repellants, or hydroacoustic presentations.

In certain embodiments, the input section comprises a tubular member configured to be at least partially submerged under water. In certain embodiments, the output section comprises two tubular members configured to be at least partially submerged under water.

In certain embodiments, the processing unit is configured to extract specific features from the information and classify the animal according to pre-determined criteria. In particular embodiments, the specific features are selected from the group consisting of size, shape, color, and behavior.

In certain embodiments, the sensor comprises a video camera, an electric field proximity sensor, a laser array photogate, side scan sonar, dual-frequency identification sonar (DIDSON), or light detection and ranging (LiDAR). In certain embodiments, the multiple output paths include a path to a holding pen or quarantine. In certain embodiments, the multiple output paths include a path out of the animal sensing system. In certain embodiments, the output section comprises two tubular members that are connected to the input section. In certain embodiments, the input section comprises a baffle configured to prevent animals from exiting the animal sensing system through the entrance. In certain embodiments, each of the multiple output paths comprises a baffle configured to prevent animals from entering the animal sensing system through the output paths. In certain embodiments, the input section and the output section are at least partially submerged under water. In certain embodiments, the sensor is disposed in a first sensing area, and the input section and/or the output section further comprises a second sensing area comprising one or more additional sensors.

In certain embodiments, the animal sensing system further comprises a catch funnel extending from the entrance, wherein the catch funnel is configured to enhance intake effectiveness.

In certain embodiments, the entrance defines a cone-shaped opening.

In certain embodiments, the animal sensing system further comprises one or more solar panels, or generation devices harvesting wind power, water current, or wave power to generate power.

In certain embodiments, the input section further comprises a size excluder configured to act as a physical barrier for entry into the animal sensing system of objects having a particular size class. In certain embodiments, the input section further comprises a bait station configured to house bait that lures animals into the animal sensing system. In particular embodiments, the bait comprises dead or alive prey animals, shiny objects, or light traps.

In certain embodiments, the sensing area comprises a visible light or IR light source.

In certain embodiments, the animal sensing system comprises two or more directional guides. In particular embodiments, the animal sensing system is configured to learn which of the two or more directional guides to use based on the one or more sensed characteristics.

In certain embodiments, the animal sensing system may take specific action to alter the path of an untagged individual animal based on sensed membership in a specific subset defined by presence within the parameter space from a known distribution.

Further provided is an animal sensing system comprising a tubular cavity comprising a sensor configured to obtain information about an animal within the tubular cavity and communicate the obtained information to a central processing unit, wherein the central processing unit is configured to count the animal, classify the animal, or control a directional guide to motivate a direction of travel of the animal, based on the obtained information.

In certain embodiments, the animal sensing system comprises an input section defining a tubular cavity and comprising a sensor; an output section connected to the input section, wherein the output section comprises a first output path defining a first output tubular cavity extending from the input section to a first exit, and second output path defining a second output tubular cavity extending from the input section to a second exit; and a directional guide capable of motivating an animal within the animal sensing system to proceed via the first exit or the second exit in order to leave the animal sensing system; wherein the central processing unit is communicatively coupled to the sensor and the directional guide, and is configured to receive data from the sensor and control the directional guide. In particular embodiments, the directional guide is movable between a first position and a second position and capable of blocking access between the tubular cavity and either of the first output tubular cavity or the second output tubular cavity. In particular embodiments, the directional guide is configured to allow access from the input section to only one of the output paths at time. In certain embodiments, the first position allows access from the tubular cavity to the first output tubular cavity, but not from the tubular cavity to the second output tubular cavity. In certain embodiments, the second position allows access from the tubular cavity to the second output tubular cavity, but not from the tubular cavity to the first output tubular cavity.

In certain embodiments, the directional guide comprises a gate. In particular embodiments, the directional guide comprises the transient activation of a light, a jet of water current, or electric shocks, magnetic fields, bubble curtains, chemical repellants, or hydroacoustic presentations.

Further provided is an animal sensing system comprising a plurality of modules each comprising a sensor and configured to permit exit of an animal therein through one of a first exit and a second exit; an entrance that permits access into the plurality of modules; and a platform connecting the plurality of modules; wherein each sensor is configured to obtain information about the animal within the module and communicate the obtained information to a central processing unit. In certain embodiments, the platform is buoyant and the animal sensing system floats in water. In other embodiments, the platform has negative buoyancy, and the animal sensing system sinks to a particular desired depth in the water column. In other embodiments, the animal sensing system rests on the bottom of a body of water. In certain embodiments, the central processing unit controls access to the first exit or the second exit by opening or closing a door in the platform.

Further provided is a method for sorting animals, the method comprising sensing one or more characteristics of an animal within an apparatus with a sensor, wherein the animal cannot exit the apparatus through an entrance from which the animal entered the apparatus; communicating the sensed characteristics to a central processing unit; using pre-determined or acquired criteria to classify the animal based on the sensed characteristics; and controlling a gate according to the classification, wherein the gate is configured to permit the animal to exit the apparatus through only one of two output paths.

In certain embodiments, the sensed characteristics are selected from the group consisting of size, shape, color, behavior, and combinations thereof. In certain embodiments, the classification is performed using multivariate statistical separation, machine and neural network learning, or genetic algorithms. In certain embodiments, the classification comprises back subtraction, object detection, object characterization to obtain object features, or object classification. In certain embodiments, the animal is a fish, a rat, a toad, a python, or a rabbit.

In certain embodiments, one of the two output paths leads to a holding pen. In certain embodiments, one of the two output paths leads to the environment from which the animal entered the apparatus. In certain embodiments, the method further comprises training the apparatus by sensing one or more characteristics of, and classifying, animals of known species, status, size, sex, morphology, coloration and patterning, physiology and behavior.

In certain embodiments, the method comprises the method comprises deploying a fluorescent tag which binds to pathogens in the skin of animals, and then detecting fluorescence from the fluorescent tag.

In certain embodiments, the method comprises collecting characteristics from known animals prior to the sensing.

In certain embodiments, the central processing unit uses pre-determined criteria to classify the animal based on the one or more characteristics, and controls two or more directional guides to motivate a direction of travel of the animal based on the one or more characteristics. In particular embodiments, the central processing unit learns which of the two or more directional guides to utilize for specific species of animal based on observed performance over time.

Further provided is a method for sensing animals, the method comprising sensing one or more characteristics of an animal as the animal passes a sensor, and communicating the one or more characteristics to a central processing unit. In certain embodiments, the central processing unit counts the animal or classifies the animal based on the one or more characteristics. In certain embodiments, the sensor is housed within an apparatus, and the animal cannot exit the apparatus through an entrance from which the animal entered the apparatus. In certain embodiments, the central processing unit uses per-determined criteria to classify the animal based on the one or more characteristics. In certain embodiments, the central processing unit controls a directional guide according to the classification, wherein the direction guide motivates a direction in which the animal may move. In certain embodiments, the directional guide comprises a gate configured to permit the animal to exit the apparatus through only one of multiple output paths. In certain embodiments, the directional guide comprises light, a jet of water current, electric shock, transient electric fields, bubble curtains, chemical repellants, or hydroacoustic presentations.

In certain embodiments, the sensed characteristics are selected from the group consisting of size, shape, color, behavior, and combinations thereof. In certain embodiments, the classification is performed using multivariate statistical separation, machine and neural network learning, or genetic algorithms. In certain embodiments, the classification comprises back subtraction, object detection, object characterization to obtain object features, or object classification.

In certain embodiments, the animal is a fish, a rat, a toad, a python, or a rabbit.

In certain embodiments, one of the multiple output paths leads to a holding pen. In certain embodiments, one of the multiple output paths leads to the environment from which the animal entered the apparatus.

In certain embodiments, the central processing unit uses per-determined criteria to classify the animal based on the one or more characteristics, and controls two or more directional guides to motivate a direction of travel of the animal based on the one or more characteristics. In particular embodiments, the central processing unit learns which of the two or more directional guides to utilize for a specific species of animal based on observed performance over time.

BRIEF DESCRIPTION OF THE DRAWINGS

The patent or application file may contain one or more drawings executed in color and/or one or more photographs. Copies of this patent or patent application publication with color drawing(s) and/or photograph(s) will be provided by the U.S. Patent and Trademark Office upon request and payment of the necessary fees.

DETAILED DESCRIPTION

Throughout this disclosure, various publications, patents, and published patent specifications are referenced by an identifying citation. The disclosures of these publications, patents, and published patent specifications are hereby incorporated by reference into the present disclosure in their entirety to more fully describe the state of the art to which this invention pertains.

Figure 1:
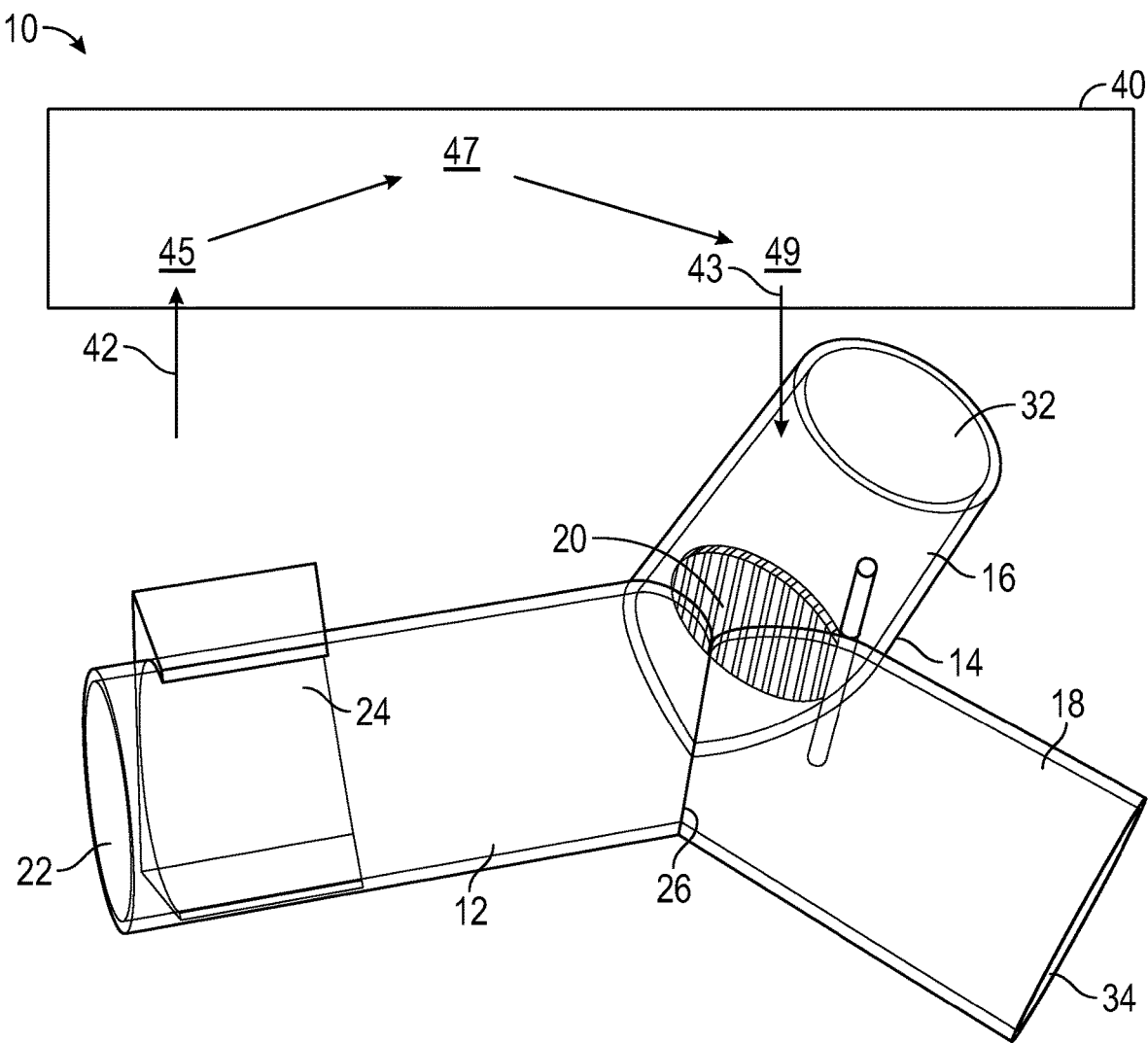
FIG. 1: Illustration of an animal sensing system according to embodiments described herein.

Provided is a system, apparatus, and method for sensing and, optionally, sorting animals such as fish as they move through a system (which may include the interior of an apparatus) configured to acquire characteristics of the animals and direct the animals into desired locations based on the measured characteristics. As generally depicted in FIG. 1, a sensor or sensor array in an input section of the animal sensing system may provide information about the characteristics of an individual animal entering the apparatus (e.g., size, shape, color, behavior) to a central processing unit (CPU). The CPU may extract specific features (morphological, behavioral, or surface appearance) and classify the individual animal according to pre-determined criteria. Depending on the outcome of this classification, the CPU controls a directional guide, such as a gate, which opens access to one of multiple output paths. An output section of the system contains the directional guide that controls whether an output path is open or closed. An output path for selected individuals may lead, for example, to a holding pen for further processing, or back to the environment. The criteria for animal classification may be obtained during an initial training phase, where animals of known species/status/size/sex/morphology can be analyzed as they traverse the system. Classification may be performed in one of several supervised or unsupervised ways, including multivariate statistical separation, machine and neural network learning, or genetic algorithms.

In general, the animal sensing system is an active, computer-controlled device to sense, classify, sort, and/or catch passing animals such as fish in real time. The animal sensing system provides a solution for invasive alien species in an environment, diseased fish in aquaculture, for harvesting fish in aquaculture, for directing animals away from hazards, for preventing unwanted catches in nets, and so on. The animal sensing system is an automated device that classifies individual animals based on morphological, physiological, genetic, or behavioral characteristics, and channels the individual animals into separate paths based on the classification. The animal sensing system is an improved alternative to the manual collection or poison control currently used to separate, collect, and suppress invasive alien species of animals. The animal sensing system may be used with animals that are unmarked, untagged, or anonymous to the animal sensing system.

Referring now to FIGS. 1-4, an animal sensing system 10 may include an input section 12 connected to an output section 14 having a first output path 16 and a second output path 18. A directional guide 20 is disposed in the output section 14, or around the connection area 26 where the output section 14 meets the input section 12, and is configured to motivate a direction of travel of an animal, or direct an animal, as the animal passes through the animal sensing system 10. In one example, the directional guide 20 is a gate configured to open a path from the input section 12 to only one of the first output path 16 or the second output path 18 at a time. In this manner, the directional guide 20 may block access to all but one possible output path. Each of the input section 12 and the output section 14 may be configured to float on the surface of water, rest on a solid surface, or to be partially or fully submerged under water.

Figure 2:
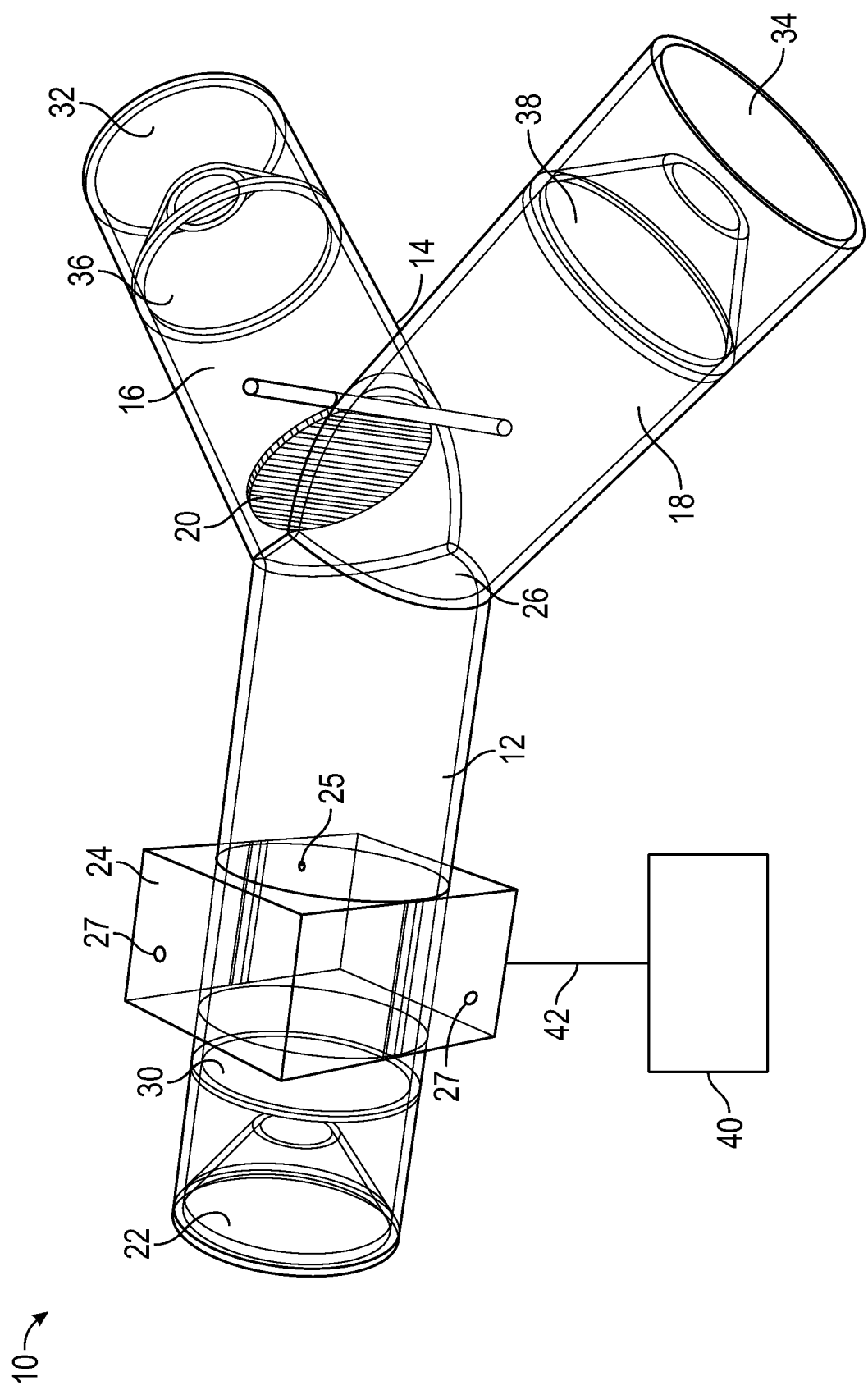
FIG. 2: Illustration of an animal sensing system according to embodiments described herein.
Figure 3:
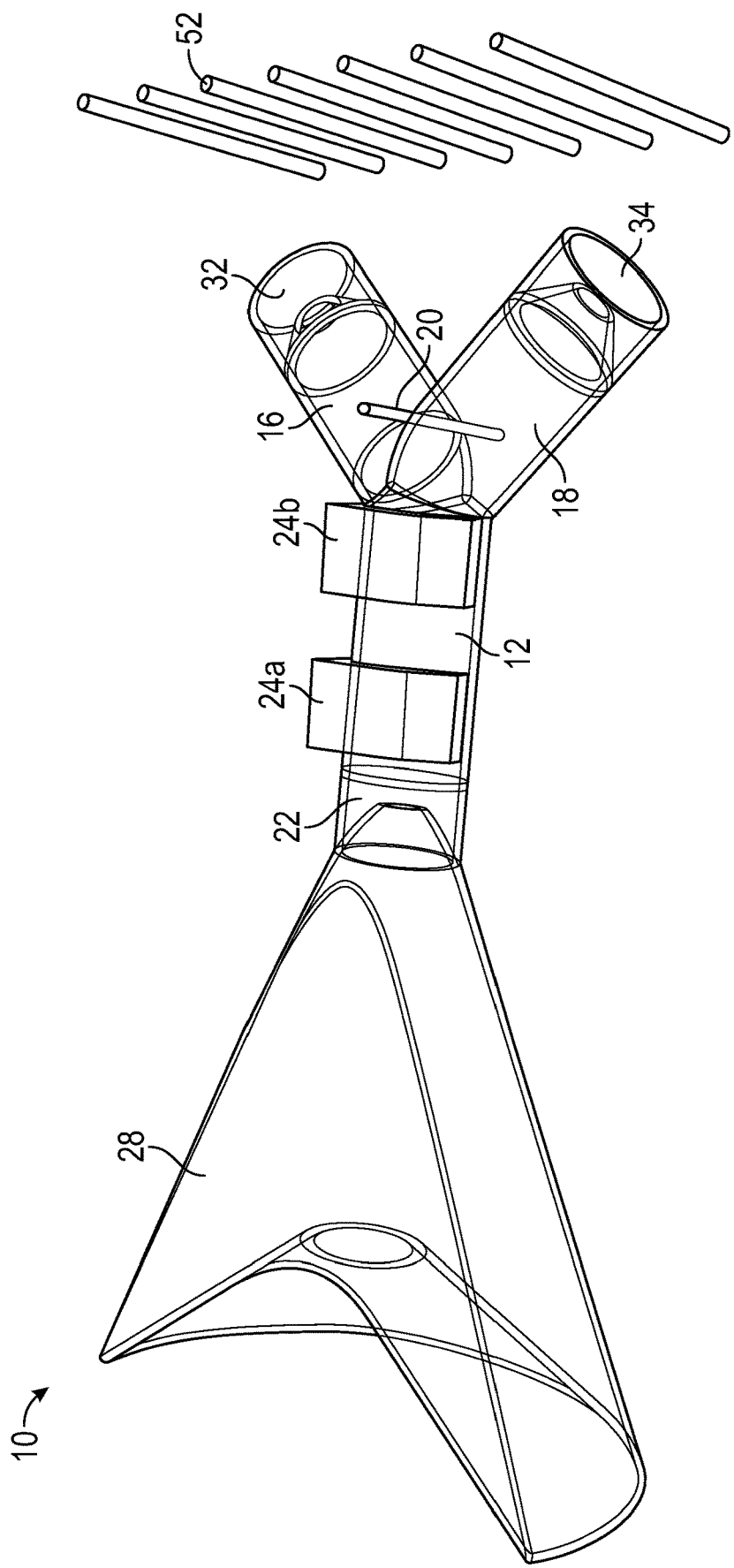
FIG. 3: Illustration of an animal sensing system according to embodiments described herein.
Figure 4:
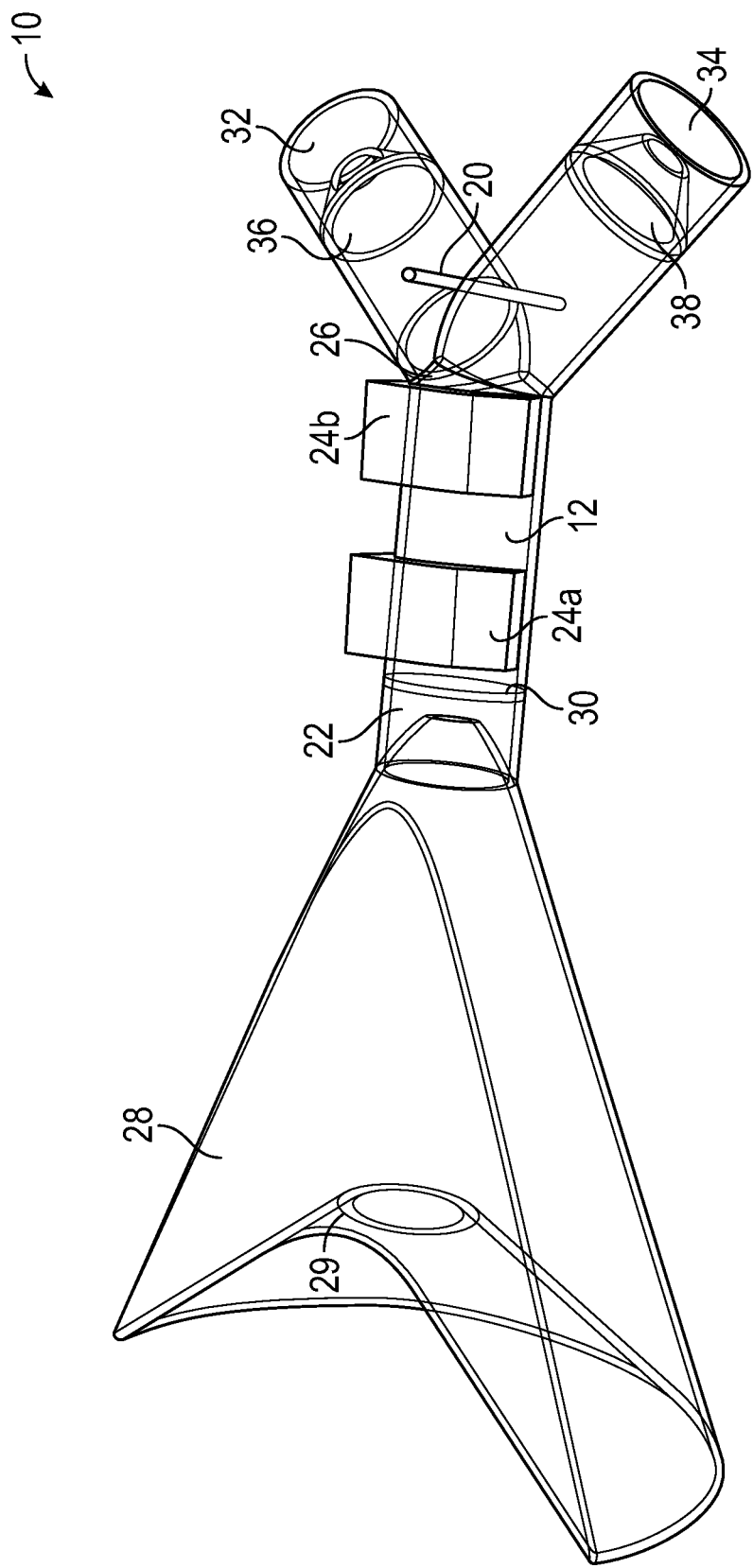
FIG. 4: Illustration of an animal sensing system according to embodiments described herein.

The input section 12 may be a generally tubular member defining a tubular cavity, and may include an entrance 22, a sensing area 24 which includes one or more sensors 25, and a connection area 26 which connects the input section 12 to the output section 14. In some embodiments, sensors 25 or arrays sensors 25 can be built into existing structures such as inlets for canals, diversion pipes, and intakes, which may then serve as the sensing area 24. As seen in FIG. 2, the entrance 22 may form a cone-shaped opening and may include an entrance baffle 30 which prevents fish or other animals from exiting the animal sensing system 10 via the entrance 22. The entrance baffle 30 may be sized so as to allow only one animal at a time into the animal sensing system 10. Optionally, the input section 12 may be connected to a catch funnel 28, as depicted in FIGS. 3-4. The catch funnel 28 widens the intake to enhance intake effectiveness, particularly when the animal sensing system 10 is being used under water. The catch funnel 28 may be configured to float on the surface of water, to rest on a solid surface, or to be submerged or at least partially submerged under water. The catch funnel 28 may be free-floating, and may facilitate deployment of the animal sensing system 10 in a river, lake, or other body of water. The catch funnel 28 may also include its own additional baffle 29.

The input section 12 may further include a size excluder, which is a physical barrier for a particular size class. The size excluder may be useful to prevent leaves, branches, or other debris from floating into, or otherwise entering, the animal sensing system 10. The input section 12 may also include a bait station, which is a mechanism to attract a particular subset of species. The bait station may include bait in the form of dead or alive prey animals, but may also or alternatively include sparkles or other shiny objects to attract animals such as fish.

As noted above, the input section 12 includes a sensing area 24 which includes one or more sensors 25. In some embodiments, such as those depicted in FIGS. 3-4, the input section 12 includes two sensing areas 24a, 24b for enhanced sensing. Embodiments of the animal sensing system 10 having more than two sensing areas 24 are entirely possible and encompassed within the scope of the present disclosure. The sensors 25 may include one or more video cameras (visible or IR), electric field proximity sensing (EFPS), side-scan sonar (SSS), adaptive resolution imaging sonar (ARIS), laser array photogates, side scan sonar, dual-frequency identification sonar (DIDSON), light detection and ranging (LiDAR), or the like. Any combination of multiple types of sensors 25 is possible. The sensors 25 are configured to sense or measure one or more characteristics of an animal within the input section 12. Furthermore, the sensing areas 24 may include one or more light sources 27, which may be visible or IR light sources. The visible or IR light sources 27 may improve the ability to sense characteristics of animals in a dark, murky, or turbid environment, such as underwater.

In some embodiments, the output section 14 includes an additional sensing area 24 with one or more sensors 25, which may be useful for determining the success of the directional guide 20.

Referring still to FIGS. 1-4, the output section 14 may include a first exit 32 from the first output path 16 and a second exit 34 from the second output path 18. The first exit 32 may include a first output baffle 36, and the second exit 34 may include a second output baffle 38, so as to prevent animals from reentering the animal sensing system 10 via the exits 32, 34. In some embodiments, when the animal sensing system 10 is disposed under water so as to sense fish, the natural current may flow within the animal sensing system 10 in the direction of from the output section 14 to the input section 12, to help prevent the entrance into the animal sensing system 10 of free-floating objects or debris instead of swimming fish. Alternatively, the animal sensing system 10 may be disposed under water such that the natural current flows in the direction of from the input section 12 to the output section 14, so as to further ensure that animals within the input section 12 do not exit the animal sensing system 10 through the entrance 22, and animals outside the animal sensing system 10 do not enter the animal sensing system 10 through the exits 32, 34. Or, instead of natural current, a current may be generated in either direction, for example, by jets housed within the animal sensing system 10.

The output paths 16, 18 may lead to wherever desired. The output paths 16, 18 typically lead to different destinations, although this is not strictly necessary if, for example, the animal sensing system 10 is being used for its sensing abilities or being used to count animals or count types of animals and not strictly to separate, sort, or catch animals. In general, though, the output paths 16, 18 lead to distinct locations. As an example, one of the output paths 16, 18 may lead to a holding pen, which is an enclosure to temporarily hold selected individual animals until the animals are manually removed. As another example, one of the output paths 16, 18 may lead to an automated harvesting device to handle and process selected individual animals. As another example, one of the output paths 16, 18 may lead to a pen for quarantined holding, configured to ensure environmental separation. As another example, one of the output paths 16, 18 may lead to a release device, configured to ensure successful return of individual animals to the environment. However, animals may be released back to the environment without a release device. Thus, one of the output paths 16, 18 may exit directly back into the environment. Combinations of different destinations may therefore include, as a non-limiting example, an animal sensing system 10 where one of the output paths 16, 18 leads directly back to the environment and the other of the output paths 16, 18 leads to a holding pen.

The directional guide 20 can be any suitable apparatus, including mechanical devices such as a gate which is movable between a first position and a second position and capable of allowing access to only one of the first output path 16 or the second output path 18 from the input section 12 at a time. The directional guide 20 may be, for example, a swing gate, or may be a metal, standard expanded or bar grate adjustable in spacing for the size of objects. A gate can be moveable between a first position and a second position. In the first position, the gate allows access from the input section 12 to the first output path 16 but not the second output path 18. In the second position, the gate allows access from the input section 12 to the second output path 18 but not the first output path 16. The gate can be controlled by any suitable means. In some embodiments, the animal sensing system 10 includes a robotic controller, which is a hardware/software combination for computer control of the position of the gate. In some embodiments, the animal sensing system 10 includes a motor/servo, which is a rotary actuator for precise control of the angular position of the gate and can be controlled by the central processing unit 40. The directional guide 20 may be automatically triggered based on information obtained by the sensor 25.

The directional guide 20, in conjunction with the entrance baffle 30, may effectively block an animal's path to exit the animal sensing system 10, forcing an animal inside the animal sensing system 10 into only one of the output paths 16, 18 in order to exit the animal sensing system 10 through either the first exit 32 or the second exit 34. Thus, in some embodiments, once inside the animal sensing system 10, an animal may only exit through one of the first exit 32 or the second exit 34, and the availability of possible exits 32, 34 is made by a central processing unit 40 which controls the directional guide 20 according to data received from the sensors 25.

In other embodiments, the directional guide 20 may be the transient activation of a light, a jet of current, or electric shocks, magnetic fields, bubble curtains, chemical repellants, hydroacoustic presentations, or other source of adverse stimulus, which may motivate a direction of travel of an animal within the animal sensing system 10, but not necessarily completely block access to any possible exit from the animal sensing system 10. Aversive stimuli for repelling or motivating a direction of travel of an animal may be inherently stressful, but damaging stimulus intensities are avoidable. Directional guides 20 such as lights are advantageous because they may be less mechanically complex or require less electricity to power than physical gates. As another option, laser diodes may be used to project a grid into the animal sensing system 10, visually 'blocking' the path. Alternatively, transient electric fields, bubble curtains, chemical repellants, or hydroacoustic presentations may be utilized. An animated or looming LED pattern or mimicked moving shadows may also be employed.

When the directional guide 20 is a mechanical device such as a gate, the central processing unit 40 may govern a servo actuator that controls the gate. Alternatively, open-loop control can govern, for example, electronic circuits that switch device relays, serial protocols for microcontrollers, or operate LED arrays. Or, when the directional guide 20 is not a mechanical device, animal movements may be biased by a stimulus, such as a visual irritant, for example, the onset of bright illumination or of variable strobe patterns.

In some embodiments, the directional guide 20 is a plurality of mechanical devices such as gates and/or adverse stimuli. Advantageously, when the directional guide 20 includes two or more gates or stimuli, the animal sensing system 10 may use artificial intelligence to learn which form of directional guide 20 to apply to which detected species. For example, the animal sensing system 10 may be deployed in an area where two species of fish are commonly found, and the animal sensing system 10 may learn over time, through a trial and error learning process, that a gate works most effectively for the first species of fish but a strobe light works most effectively for the second species of fish. Accordingly, the animal sensing system 10 can be trained to utilize the more effective directional guide 20 for the species of animal that has been detected from the characteristics sensed while the animal is present in the sensing area 24. Artificial network learning may be utilized to derive and automatically administer the most effective directional guide 20 or combination of directional guide 20 for each situation.

It is understood that, although two output paths 16, 18 and two exits 32, 34 are described and shown herein for illustrative purposes, the animal sensing system 10 may include more than two output paths and exits. For example, the animal sensing system 10 may include three output paths and three exits, or four output paths and four exits. The animal sensing system 10 is not limited to binary, two-way classification, but, rather, can be used for more involved classification, sorting animals into three or more groups instead of simply two groups. Furthermore, embodiments of the animal sensing system 10 without any physical output paths 16, 18 and exits 32, 34 are possible and encompassed within the scope of the present disclosure. For example, the embodiment of the animal sensing system 10 depicted in FIG. 7, discussed in more detail below, does not include physical structures for output paths or exits.

The central processing unit 40 is communicatively coupled to the sensors 25 and the directional guide 20. As used herein, the term "communicatively coupled" means that the components are capable of exchanging data signals with one another such as, for example, electrical signals via conductive medium, electromagnetic signals via air, optical signals via optical waveguides, and the like. In some embodiments, the central processing unit 40 is in communication with the one or more sensors 25 and the directional guide 20 through link 42, which may be a physical connection (i.e., wired) or a wireless connection such as a Bluetooth or cellular connection. In some embodiments, the central processing unit 40 is in communication with the directional guide 20 through link 43, which may be a physical connection (i.e., wired) or a wireless connection such as a Bluetooth or cellular connection. The central processing unit 40 is configured to receive data from the sensors 25, process the received data, and control the directional guide 20, such as by controlling the position of a gate, according to the processed data so as to direct an animal within the animal sensing system 10 to a desired location through either the first exit 32 or the second exit 34.

As depicted in FIG. 1, the central processing unit 40 may process the signals received from the sensors 25 through link 42, depicted at step 45, may determine one or more classifications based on the processed signals, depicted at step 47, and may send a command to the directional guide 20 through link 43 based on the determined classification, depicted at step 49. Furthermore, the central processing unit 40 can be communicatively coupled to one or more memory components that can store logic and/or input received from the central processing unit 40. The memory components may be RAM, ROM, a flash memory, a hard drive, or any device capable of storing machine readable instructions.

The central processing unit 40 may be a controller, an integrated circuit, a microchip, a computer, a co-processor, cloud-deployed computing instance, or any other computing device or combination of computing devices. In one non-limiting example, the central processing unit 40 may be or may include, for example, a Coral Dev Board with Edge Tensorflow Lite processing unit from Google, featuring a NXP i.MX 8M System on a Chip (SOC) with quad-core Cortex-A53 and 1 GB of LPDDR4 RAM. Low current requirements make this processor eminently suited for field deployment. This SOC offers powerful computing, but demands respectful handling of its limited resources. Using remote command-line login and command execution via a secure shell protocol, communicating with this unit in the field may be conducted in headless mode. Open-loop control logic for this may be based on a lightweight, open source programming framework, such as an extendable, multi-threaded, java model for video tracking applications. Performance-critical functions may be dynamically included as native C libraries (OpenCV, Tensorflow Lite), producing significant performance from a system with such a small power footprint. A cellular modem may be used to centrally transmit operational summaries describing system status and activities, operational data such as local animal classification details, and a representative image for each event. Following retraining, the model may then be deployed back to the central processing unit 40 in the field in order to update the neural network model used in classification and in control of directional guide 20 control strategies.

The underlying open-source computing framework (JavaGrinders) is designed to interface over a variety of networking protocols (I2C, SPI, USB2, USB3). The multivariate distribution for individual characteristics captured by the sensors may be graphically represented via t-distributed Stochastic Neighbor Embedding (t-SNE). Segmentation of the multi-dimensional data space into single species clusters can be performed with k-means and random forest algorithms. The images can be subjected to classification via a convolution neural network model using TensorFlow and OpenCV libraries. The model assigns probability scores for species identification to all individuals detected within the active sensor area. Classification details, along with a representative image, can be logged to local storage for every instance in which an animal enters the sensing area 24. The TensorFlow Lite models are able to run high performance inference locally using the hardware acceleration by the board's Edge TPU. The object detection model can be re-trained at regular intervals via a full model retraining approach (i.e., where each layer of the neural network is re-trained using the accumulated dataset of video frames). After configuring the training pipeline on a Linux workstation, the training strategy can be executed until the training converges on a stable solution. The trained model can then be converted, optimized, and compiled to run on the Edge TPU and transmitted back to the Carol Dev Board.

The sensor 25 and central processing unit 40 may provide real-time classification with respect to the presence, number, size, and species identity of individual animals entering the sensing area 24. The sensor 25 signals the presence of an individual matching specific criteria to the central processing unit 40, which can guide the individual animal towards a desired path by controlling the directional guide 20. Efficient classification is based on a combination of morphological and behavioral traits (e.g., body shape, fin position, bending geometry), captured with sensors 25 such as visible or infrared cameras in smaller implementations, or LiDAR or SONAR imaging for applications that demand larger scales. The animal sensing system 10 can accommodate a wide range of animal sizes. For example, miniaturized versions of the animal sensing system 10 may be made for larval and small fish. The selection of traits permits the targeting of specific subsets while those outside such a range are not impacted. Assessment of diversion success may be obtained with an additional sensor circuit.

Any of the electronics in the animal sensing system 10 may be encased within waterproof housings so as to accommodate underwater deployment of the animal sensing system 10. Also, wireless communications permit remote access to the animal sensing system 10 for maintenance, testing, data retrieval, and upload of model improvements from a central location.

The data from the sensors 25 may be in the form of images. There are a variety of possible ways that the central processing unit 40 may process the images from the sensors 25. For example, image processing may involve background subtractions, where a reference is subtracted without objects, then the remaining difference matrix is analyzed for objects. The image processing may involve object detection to test whether an object is present, object characterization to obtain object features, or object classification to assign objects to one of several mutually exclusive categories. Single frame object outlines for measures of morphology include length, height, shape factor, orientation, color, markings, pattern, or texture. Changes in object outlines from consecutive frames can be used for measures of behavior include speed, distance, direction, motion characteristics, acceleration, or changes in shape or undulation.

Figure 5:
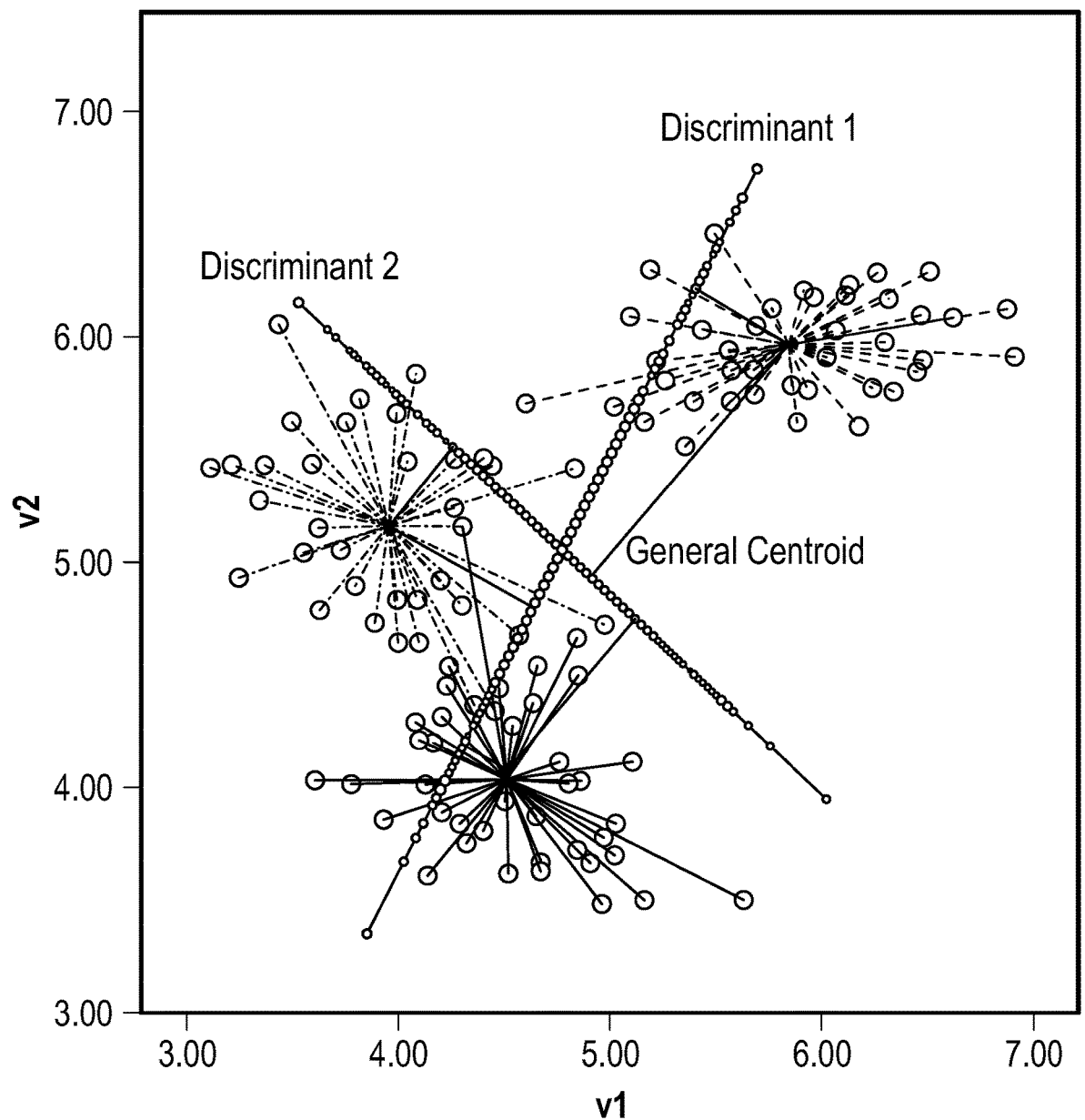
FIG. 5: Illustration of statistical classification via discriminant function analysis (DFA).

The animal sensing system 10 may use statistical classification to classify animals. Statistical classification finds a combination of features that separates classes of objects based on morphological features. Non-limiting examples include discriminant function analysis (DFA), cluster analysis, or dimension reducing methods such as t-SNE. FIG. 5 illustrates statistical classification via DFA. Training may be conducted by characterizing known species for morphological and behavioral characteristics, and then testing may involve using characteristics for unknown individuals to assign to one of these species.

Figure 6:
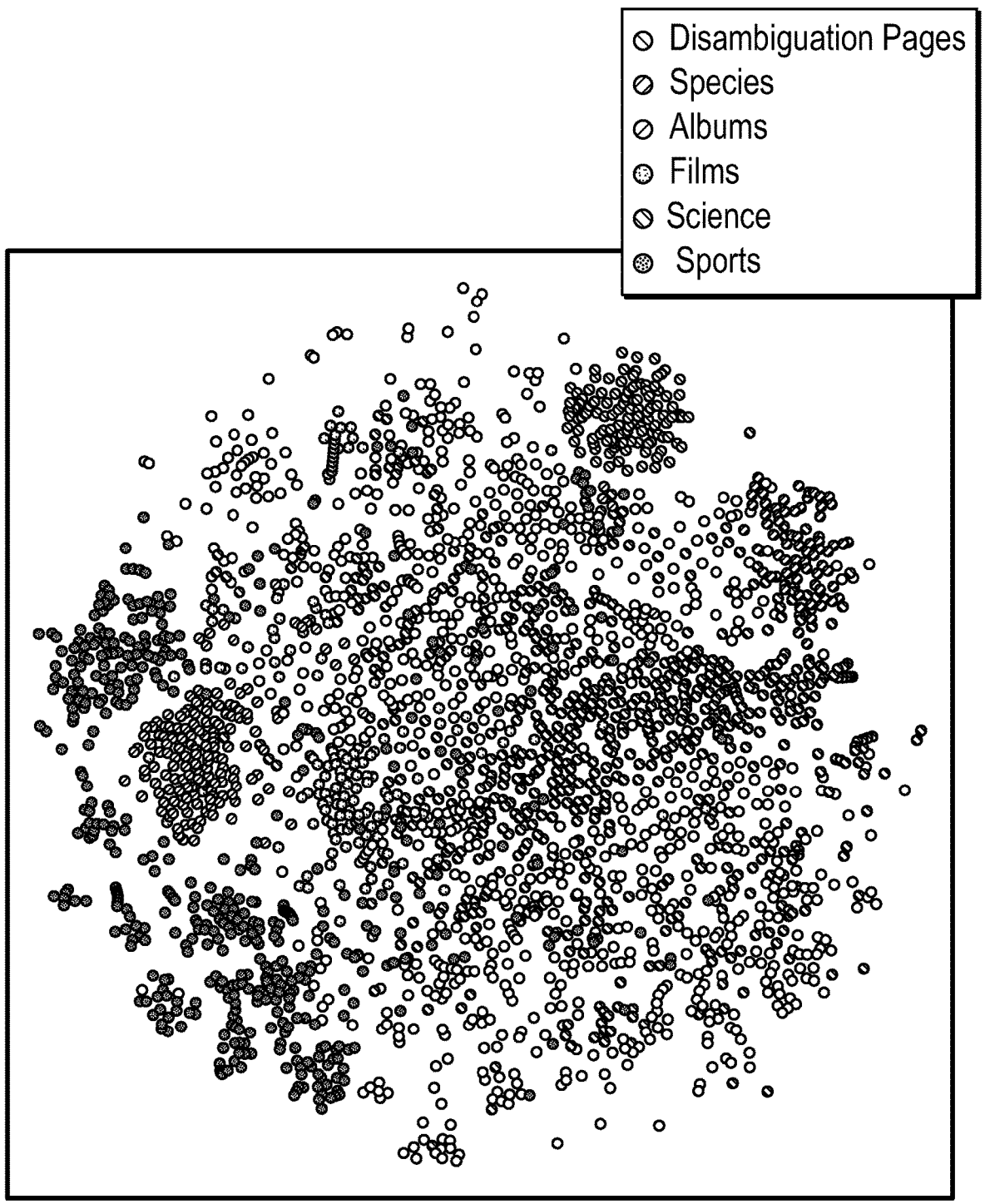
FIG. 6: Illustration of classification by deep network learning.

The animal sensing system 10 may use machine and deep network learning to classify animals. Machine and deep network learning may be supervised or unsupervised. FIG. 6 illustrates a classification based on deep network learning. Neural networks learn to transform data from an original raw representation into one that is optimized for identifying and distinguishing items of interest.

The animal sensing system 10 may use genetic algorithms to classify animals Genetic algorithms are optimized solutions to categorize object classes. Genetic algorithms solve both constrained and unconstrained optimization problems based on natural selection, by repeatedly modifying the characteristics in order to find optimized solutions for classification.

The animal sensing system 10 may use a layer of smart technologies with artificial intelligence solutions to classify animals. The animal sensing system 10 is able to classify individual fish based on distinct, morphological and behavioral characteristics, and then exert different treatments based on the classification. In various embodiments, the animal sensing system 10 may be automated to assure selective passage of animals (i.e., as an animal sorter), prevent entrainment of animals (i.e., as an animal excluder), reject specific individuals (i.e. as a by-catch excluder in trawling nets), or specifically extract individual animals (i.e., as an animal harvester). These capabilities may be combined to provide a synthetic immune system for ecological health. The animal sensing system 10 may be adapted for different locations, functions, and needs.

It is understood that while only certain examples of processing devices and methods are described herein, various other processing devices and methods are entirely encompassed within the scope of the present disclosure.

The embodiment of the animal sensing system 10 depicted in FIG. 2 may be particularly useful as a fish sorter. Fish classified as desirable can be allowed to continue without disruption, while individual fish of undesirable species can be physically diverted into a holding pen. Program operations may be trained to identify a set of invasive species, and such individuals may be identified, diverted, and collected in a holding pen while all others are permitted to pass with minimal disturbance. In one non-limiting example, effective sensing operations at flow rates of up to 5 cfs are possible with a one-foot diameter input section 12. Higher flows can be accommodated with additional deployments in parallel. This embodiment of the animal sorting system 10 may be used to separate invasive species from native species at a choke point, such as a fish ladder. The central processing unit 40 may exert statistical or artificial intelligence classification as to species identity, which by itself may provide an adaptive tool for population monitoring.

The embodiment of the animal sensing system 10 depicted in FIGS. 3-4 may be particularly useful as a fish harvester. This embodiment may perform automated capture of fish that fall within a defined morphological character space. The catch funnel 28 may be an anchored, floating platform. The entrance baffle 30 may include a mesh structure with a baffle that funnels individuals into the sensing area 24. Once a fish has entered the sensing area 24, the fish can only exit by passing through the animal sensing system 10. Individual fish recognized as invasive species, for example, can be directed toward the one of the first exit 32 or second exit 34 that empties into a holding pen. Other individual fish are ignored and permitted to freely continue back into the surrounding environment, through the other of the first exit 32 or second exit 34. The animal sensing system 10 may be deployed near a made-made object 52, such as a dam, as depicted in FIG. 3, or may be deployed nearby no known structure, as depicted in FIG. 4.

Figure 7:
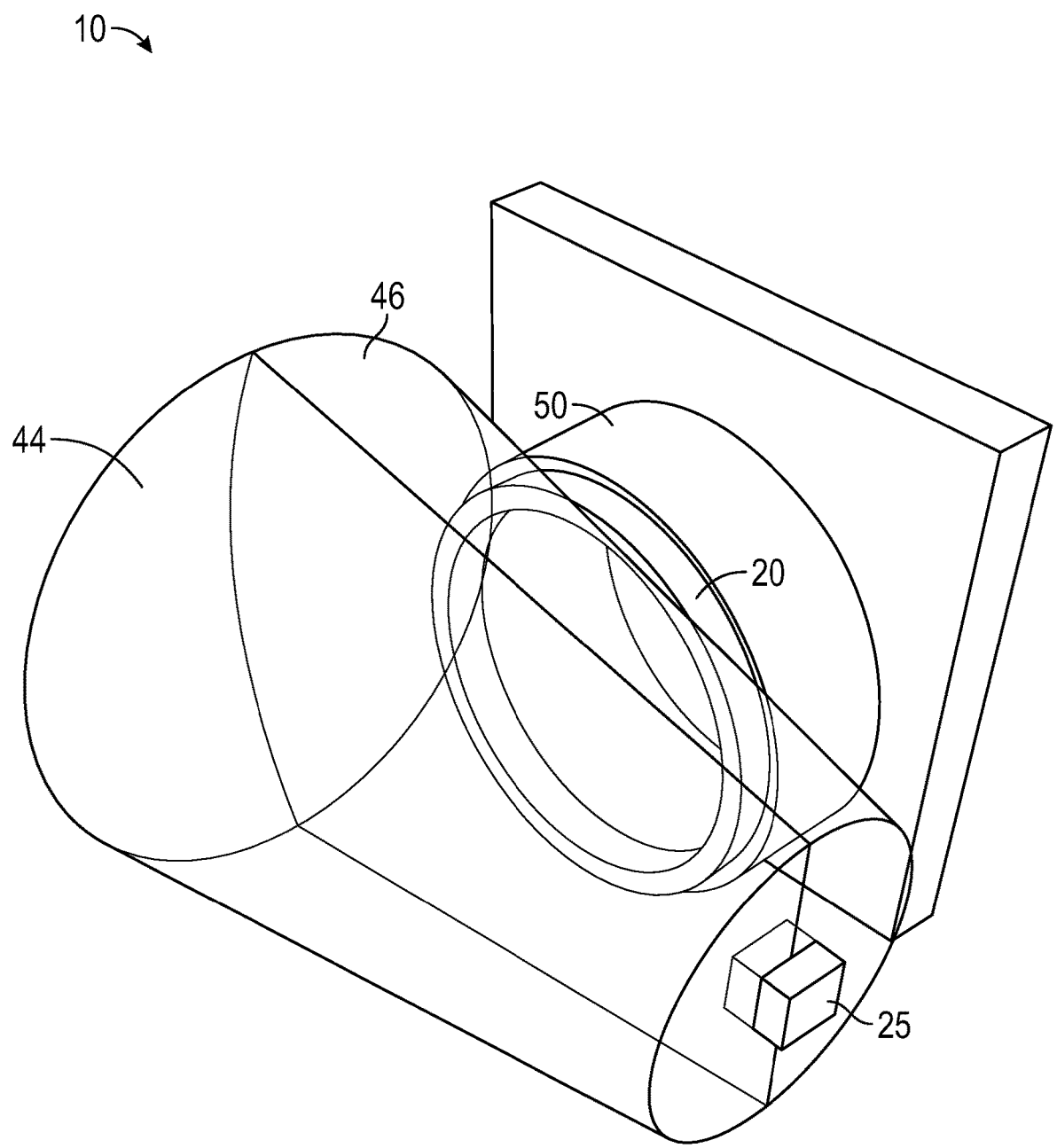
FIG. 7: Illustrations of a non-limiting example of an animal sensing system deployed as a fish excluder.

FIG. 7 depicts an alternative embodiments of the animal sensing system 10 adapted for fish exclusion, for instance in the area of a hazard. In this embodiment, a sensor 25 is positioned next to an intake pipe 50 in order to image the area in front of the intake pipe 50. The imaging space is subdivided into a detection zone 44 and an assessment zone 46. The initial detection zone 44 triggers deterrent interventions from the directional guide 20 surrounding the intake pipe 50. The success of the deterrent interventions is judged by whether the fish exits the danger zone instead of continuing towards it and into the assessment zone 46. Notably, in this embodiment, the animal sensing system 10 does not include physical exits. Rather, this embodiment of the animal sensing system 10 is adapted for a situation in which its purpose is to ward off animals away from a hazard, and learn the best approach for doing so for each species it encounters.

The embodiment of the animal sensing system 10 depicted in FIG. 7 may be fitted around an existing intake pipe 50, for example at a turbine. The deterrent interventions from the directional guide 20 may be trained onto the space where the fish are exposed to imminent danger from the turbine. The sensor 25 may be side-mounted and be configured to image the area in front of the intake pipe 50 while a set of behavioral deterrents from the directional guide 20 are deployed surrounding the pipe rim. As water is diverted, fish generally face against the flow and are drawn into the detection zone 44 facing out. A fish approaching the detection zone 44 triggers adaptive deployment of behavioral repellents from the directional guide 20. This mode of triggering deterrents, as opposed to operating continuously, boosts effectiveness with reduced adaptation to the aversive cue and reduced cost of operation. In addition, species recognition permits the selection of the most effective strategies for the specific target in the danger zone near the turbine.

Effectiveness may be judged by whether the fish continues into the assessment zone 46 despite the behavioral deterrents 48, or whether the deterrent intervention was successful in preventing further encroachment into the intake pipe 50. The effective limit on the diameter of the intake pipe 50 depends on the sensor 25 being deployed. With infrared imaging, for example, pipe diameter options may be below about 1 m. However, substantially larger diameters are possible with sensors 25 that offer greater range, such as LiDAR or SONAR.

The effectiveness of each attempt to turn away an individual fish from the danger through the intake pipe 50 (e.g., from a turbine) can be recorded. Over time, the performance of the animal sensing system 10 improves as accumulating information informs the selection of the most effective deterrence strategies using neural network learning. This flexibility allows the animal sensing system 10 to adjust selected deterrents depending on target species, adjust to environmental conditions and rainfall, and anticipate diurnal or seasonal changes in species composition or size class frequency.

The animal sensing system 10 may continuously and autonomously monitor a site for passing fish, then exact physical or sensory guidance cues. With the ability to adjust operations to current and predicted needs, and to continuously improve efficacy, the animal sensing system 10 is versatile and multipurpose. The animal sensing system 10 may be self-contained and field-deployed so as to selectively limit the harmful consequences that migratory animals experience when encountering man-made barriers and impediments.

In use, operational data may be saved locally each time the animal sensing system 10 is triggered, and then uploaded to a central facility at regular intervals. This may include an image of the individual animals passing through the animal sensing system 10, information about whether and what actions were triggered, and a record of the outcome. As information accumulates, collected data may be reexamined at regular intervals with machine learning algorithms, and the improved models may be uploaded back to the system for enhanced function. Over time, this approach may progressively enhance the effectiveness of convolution layers for classifying individual fish, for example for assigning species identity, and to increase success of individual deterrent interventions. Artificial network learning may be utilized to derive and automatically administer the most effective combination of deterrents for each situation. Artificial network learning may be utilized to derive and automatically administer the most effective combination of deterrents for each situation.

Figure 8:
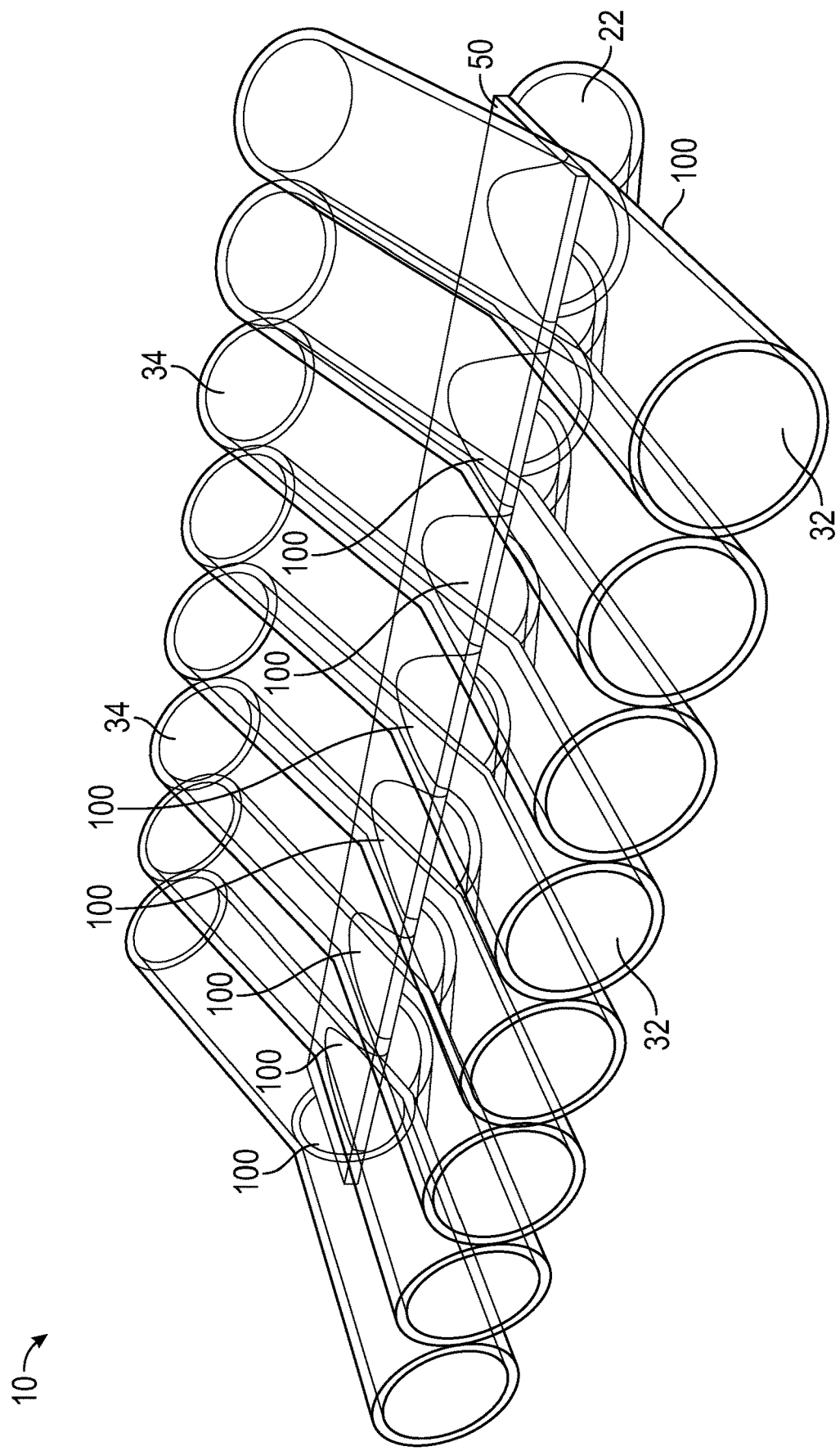
FIG. 8: Illustration of a non-limiting example of an animal sensing system having a significant number of exits.

FIG. 8 depicts an alternative embodiment of the animal sensing system 10 in which the animal sensing system 10 includes a significant number of exits 32, 34. In this embodiment, the animal sensing system 10 may be particularly useful for reducing by-catch in trawling nets. Trawling is a method of fishing that involves pulling a fishing net through the water behind one or more boats. Often, trawling nets inadvertently entangle animals such as dolphins or other species that are unintended. The animal sensing system 10 may be employed in or around a trawling net to distinguish between the fish desired to be caught and unwanted catches. In this embodiment, the animal sensing system 10 is composed of a plurality of modules 100 each comprising a first exit 32, and a second exit 34. Each module 100 is connected in parallel on a platform 50. The platform 50 may be buoyant and cause the animal sensing system 10 to float. The high number of exits 32, 34 allows for high throughput, which is important because large numbers of fish are often captured in trawling nets. In some embodiments, the modules 100 share the same entrance 22, while in other embodiments, each module 100 includes its own entrance 22. The entrance(s) 22 may be placed within or nearby the trawling net. Each module 100 may include its own sensing area 24 and sensors 25, and may communicate with the same central processing unit 40 or a plurality of central processing units 40. The central processing unit(s) 40, in turn, control directional guides 20 within each module 100 to allow access to either the first exit 32 or the second exit 34. The directional guide 20 may be in the form of a mechanical door or opening in the platform 50, but may be any other suitable mechanism or stimuli as discussed above. The first exits 32 may be directed to a location within the trawling net, while the second exits 34 may be directed to a location out of the trawling net. Other arrangements for where the first and second exits 32, 34 lead are entirely possible and within the scope of the present disclosure.

As another example, an animal sensing system 10 as described herein can be employed in connection with a fish farm, to act as a sick bay for fish identified by the animal sensing system 10 to be diseased or injured. In such an embodiment, the animal sensing system 10 may separate the diseased or injured fish from the general population in a holding pen for a period of quarantine or immediate removal. Furthermore, an animal sensing system 10 may be utilized in connection with a fish farm for selecting and separating fish for harvesting based on size, sex, or other characteristics.

The physical components of the animal sensing system 10 may be constructed out of any suitable material, including plastics such as PVC, metals, wood, or combinations thereof. The optimal material for the animal sensing system 10 will depend on the desired use for the animal sensing system 10. For example, when the animal sensing system 10 is going to be submerged under water, the animal sensing system 10 should be constructed from a material suitable for prolonged submersion under water, such as PVC.

The animal sensing system 10 may be powered by grid power. A direct grid supply with main cables can be supplied to power the animal sensing system 10, with occasional charging of a battery backup. Alternatively, the animal sensing system 10 can be configured with solar panels, wind power generation devices, or current and wave power generation devices in order to generate sufficient power to run without grid power. The animal sensing system 10 may include a number of photovoltaic cells with deep discharge batteries, fuel cells, power generators, and the like for distributed energy generation and storage.

The animal sensing system 10 may be operated remotely. The animal sensing system 10 may include sufficient communications equipment in order to be connected to a network. The animal sensing system 10 may further include one or more features which adjust the animal sensing system 10 to changes in weather, water levels, turbidity in water in which the animal sensing system 10 is disposed, temperature, salinity of water in which the animal sensing system 10 is disposed, and the time of day (i.e., whether it is light or dark). For example, the animal sensing system 10 may include a clock in order to determine an appropriate time to illuminate bait in a bait station with a suitable light source.

In some circumstances, early detection of diseased individuals is important for many reasons, such as for countering the spread of disease in aquaculture facilities or in the environment. Advantageously, the animal sensing system 10 can detect and classify animals based on signs or characteristics of diseases. For example, skin changes can be a sign of red pest, mouth fungus, scale and fin rot, Rust, leeches, *Costia*, *Myxosoma*, or *Saprolegnia*. Shape changes can be a sign of tuberculosis, scale protrusion, or nematodes. Scraping behavior on rough objects can be a sign of *Ergasilus*, *Lernacea*, flukes, or nematodes. Sluggish behavior can be a sign of *Ichthyosporidium, Hexamita, Plistophora, Chilodonella*, or *Myxosporidisis*. Many other indicators of diseases are known and can be used to classify animals as likely diseased or not likely diseased.

Furthermore, diseased animals may be detected by deploying a fluorescent tag which binds to pathogens in the skin of animals, and then detected fluorescence from the fluorescent tag. Accordingly, the animal sensing system 10 may further include a delivery system for delivering a fluorescent tag into the environment in or around the animal sensing system 10.

Although sensing of morphological or behavioral characteristics are described for exemplary purposes, sorting on the basis of other types of characteristics is entirely possible and within the scope of the present disclosure. For example, sorting animals on the basis of size or sex may be desired for applications such as fish farming. This may allow for improved packaging, gamete harvesting, artificial selection for size, or splitting of a population.

Figure 9:
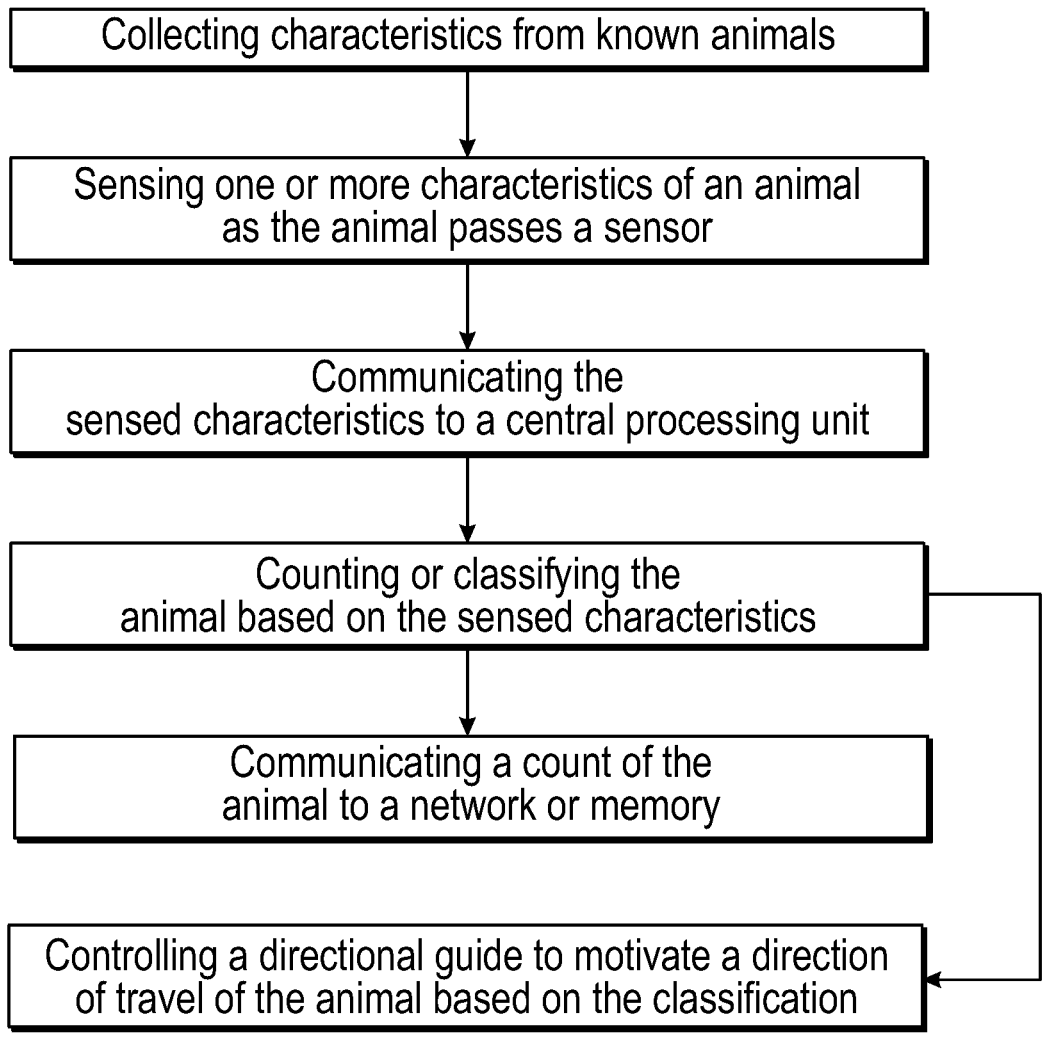
FIG. 9: Block diagram showing a method of counting or classifying animals.

Referring now to FIG. 9, a non-limiting example method of classifying or counting an animal is depicted. Characteristics of known animals may be collected as a first step, to train the central processing unit. However, this supervised learning is optional. One or more characteristics of an animal is sensed as the animal passes by a sensor, such as a sensor within the sensing area of an apparatus defining tubular cavities. The sensed characteristics are then communicated from the sensor to a central processing unit, which counts or classifies the animal based on the sensed characteristics. The central processing unit may either control a directional guide to motivate a direction of travel of the animal based on the classification, or may communicate a count of the animal to a network or to memory.

The animal sensing system may provide an automated alternative to manual collection or poisoning of undesired species, and may alternatively be used to count animals. The animal sensing system is particularly useful as a fish sorter, but may be used to count or sort other animals and is by no means limited to being used under water. For example, the animal sensing system may be used to sort specific species of rats from other animals (e.g., on islands), or rabbits, pythons, or toads from other animals. When used as a fish sorter, the animal sensing system may be deployed in areas where organisms naturally want to move, such as migrations or spawning locations. Advantageously, the animal sensing system may be low-profile and leave little to no environmental impact on the environment in which it is deployed. Detection algorithms can be tailored to target any combination of size classes or life stages.

Certain embodiments of the systems, apparatuses, devices, and methods disclosed herein are defined in the above examples. It should be understood that these examples, while indicating particular embodiments of the invention, are given by way of illustration only. From the above discussion and these examples, one skilled in the art can ascertain the essential characteristics of this disclosure, and without departing from the spirit and scope thereof, can make various changes and modifications to adapt the compositions and methods described herein to various usages and conditions. Various changes may be made and equivalents may be substituted for elements thereof without departing from the essential scope of the disclosure. In addition, many modifications may be made to adapt a particular situation or material to the teachings of the disclosure without departing from the essential scope thereof.

What is claimed is:

1. An animal sensing system comprising:
    a sensing area comprising at least one sensor configured to obtain information about one or more characteristics of an animal as the animal passes through the sensing area;
    an input section housing the sensing area and comprising an entrance, wherein the sensor is configured to obtain information on one or more characteristics of the animal while the animal is within the input section;

an output section connected to the input section and comprising a directional guide and multiple output paths, wherein the directional guide is configured to constrain travel of the animal to one direction within the animal sensing system; and a processing unit communicatively coupled to the sensor;

wherein the sensor is configured to communicate the one or more sensed characteristics to the processing unit;

wherein the processing unit is communicatively coupled to the directional guide, and is configured to receive the information from the sensor and control the directional guide; and wherein each of the multiple output paths comprises an output baffle configured to prevent animals from entering the animal sensing system through the output paths.

2. The animal sensing system of claim 1, wherein the directional guide is configured to control access from the input section to at least one of the multiple output paths.

3. The animal sensing system of claim 1, wherein the directional guide comprises a gate, transient activation of a light, a jet of water current, or electric shocks, magnetic fields, bubble curtains, chemical repellants, hydroacoustic presentations, or other source of adverse stimulus.

4. The animal sensing system of claim 1, wherein the input section comprises a tubular member configured to be at least partially submerged under water.

5. The animal sensing system of claim 1, wherein the output section comprises two tubular members configured to be at least partially submerged under water.

6. The animal sensing system of claim 1, wherein the processing unit is configured to extract specific features from the information and either count the animal or classify the animal according to pre-determined criteria, wherein the specific features are selected from the group consisting of size, shape, color, and behavior.

7. The animal sensing system of claim 1, wherein the sensor comprises a video camera, an electric field proximity sensor, a laser array photogate, side-scan sonar, dual-frequency identification sonar (DIDSON), or light detection and ranging (LIDAR).

8. The animal sensing system of claim 2, wherein the multiple output paths include a path to a holding pen.

9. The animal sensing system of claim 1, wherein the output section comprises two tubular members that are connected to the input section.

10. The animal sensing system of claim 1, wherein the input section comprises a baffle configured to prevent animals from exiting the animal sensing system through the entrance.

11. The animal sensing system of claim 1, wherein the input section further comprises a size excluder configured to act as a physical barrier for entry into the animal sensing system of objects having a particular size class.

12. The animal sensing system of claim 1, comprising two or more directional guides.

13. The animal sensing system of claim 1, wherein:
a tubular cavity comprises the sensor;
the input section houses the tubular cavity and the sensor;
the output section comprises a first output path defining a first output tubular cavity extending from the input section to a first exit, and a second output path defining a second output tubular cavity extending from the input section to a second exit;
the directional guide is capable of directing an animal within the animal sensing system towards the first exit or the second exit in order to leave the animal sensing system; and
the sensor is configured to obtain information about an animal within the tubular cavity and communicate the obtained information to the processing unit, wherein the processing unit is configured to count the animal, classify the animal, or control the directional guide to direct the animal towards a particular output path, based on the obtained information.

14. The animal sensing system of claim 13, wherein the directional guide is a gate movable between a first position and a second position, and is capable of blocking access between the tubular cavity and either of the first output tubular cavity or the second output tubular cavity, or wherein the directional guide comprises transient activation of a light, a jet of water current, or electric shocks, magnetic fields, bubble curtains, chemical repellants, or hydroacoustic presentations.

15. The animal sensing system of claim 13, wherein the directional guide is configured to allow access from the input section to only one of the output paths at time.

16. The animal sensing system of claim 14, wherein the first position allows access from the tubular cavity to the first output tubular cavity, but not the tubular cavity to the second output tubular cavity, and
wherein the second position allows access from the tubular cavity to the second output tubular cavity, but not from the tubular cavity to the first output tubular cavity.

17. An animal sensing system comprising:
a sensing area comprising at least one sensor configured to obtain information about one or more characteristics of an animal as the animal passes through the sensing area;
an input section housing the sensing area and comprising an entrance, wherein the sensor is configured to obtain information on one or more characteristics of the animal while the animal is within the input section;
an output section connected to the input section comprising two or more directional guides and multiple output paths, wherein the two or more directional guides are each configured to constrain travel of the animal to one direction within the animal sensing system; and
a processing unit communicatively coupled to the sensor;
wherein the sensor is configured to communicate the one or more sensed characteristics to the processing unit;
wherein the processing unit is communicatively coupled to the directional guide, and is configured to receive the information from the sensor and control the directional guide; and
wherein the animal sensing system is configured to learn which of the two or more directional guides to use based on the one or more sensed characteristics.

18. An animal sensing system comprising:
a plurality of modules each comprising a sensor, a first exit, and a second exit, and each being configured to permit exit of an animal therein through one the first exit and the second exit;
an entrance that permits access into the plurality of modules; and
a platform connecting the plurality of modules;
wherein each sensor is configured to obtain information about the animal within the module and communicate the obtained information to a processing unit.

19. The animal sensing system of claim 18, wherein the platform is buoyant and the animal sensing system floats in water.

20. The animal sensing system of claim 18, wherein the platform has negative buoyancy, and the animal sensing system sinks to a desired depth in a water column.

21. The animal sensing system of claim 18, wherein the animal sensing system is configured to rest on a bottom of a body of water.

22. The animal sensing system of claim 18, wherein the processing unit controls access to the first exit or the second exit by opening or closing a door in the platform.

23. A method for sensing animals, the method comprising:
sensing one or more characteristics of an animal as the animal passes a sensor; and
communicating the one or more characteristics to a processing unit;
wherein the processing unit counts the animal or classifies the animal based on the one or more characteristics;
wherein the classification is performed using multivariate statistical separation, machine and neural network learning, or genetic algorithms; and
wherein the processing unit uses pre-determined criteria to classify the animal based on the one or more characteristics, and controls two or more directional guides to motivate a direction of travel of the animal based on the one or more characteristics, and wherein the processing unit learns which of the two or more directional guides to utilize for a specific species of animal based on observed performance over time.

24. The method of claim 23, wherein wherein the two or more directional guides direct the animal to move through a specific output path.

25. The method of claim 23, wherein the sensed characteristics are selected from the group consisting of size, shape, color, behavior, and combinations thereof.

26. The method of claim 23, wherein the classification comprises background subtraction, object detection, object characterization to obtain object features, or object classification.

27. The method of claim 23, wherein the animal is a fish, a rat, a toad, a python, or a rabbit.

28. The method of claim 23, further comprising multiple output paths, wherein one of the output paths leads to a holding pen.

29. A method for detecting diseased animals, the method comprising:
sensing one or more characteristics of an animal as the animal passes a sensor; and
communicating the one or more characteristics to a processing unit;
wherein the method comprises deploying a fluorescent tag which binds to pathogens in the skin of animals, and then detecting fluorescence from the fluorescent tag so as to detect diseased animals.

30. The animal sensing system of claim 18, wherein each of the plurality of modules is connected in parallel on the platform such that the first exit of each of the plurality of modules is on a first side of the platform and the second exit of each of the plurality of modules is on a second side of the platform.

* * * * *